Patented Feb. 13, 1923.

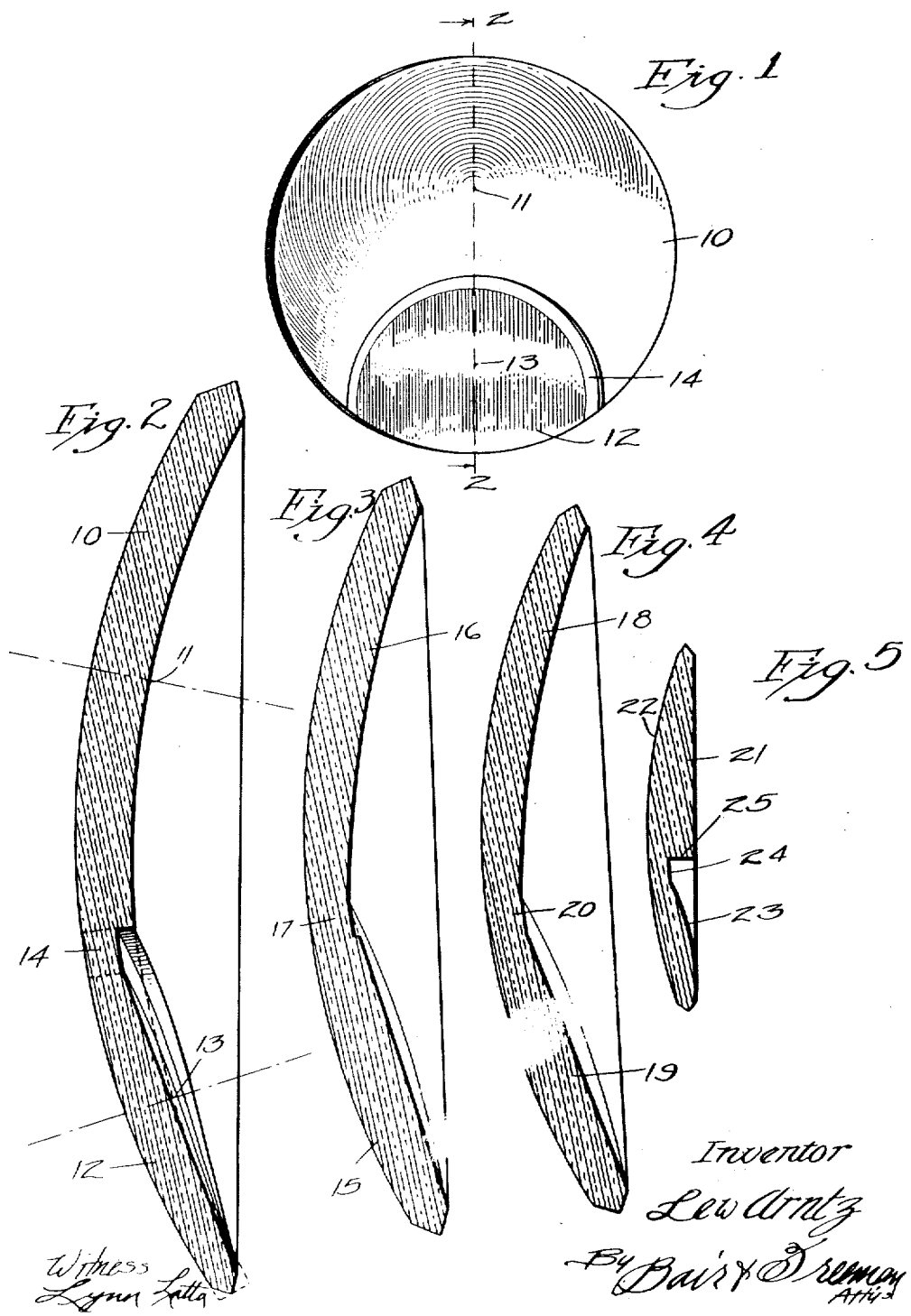

1,445,063

UNITED STATES PATENT OFFICE.

LEW ARNTZ, OF DES MOINES, IOWA.

BIFOCAL LENS.

Application filed July 29, 1922. Serial No. 578,420.

*To all whom it may concern:*

Be it known that I, LEW ARNTZ, a citizen of the United States, and a resident of Des Moines, in the county of Polk and State of Iowa, have invented a certain new and useful Bifocal Lens, of which the following is a specification.

The object of my invention is to provide a bifocal lens of simple structure, having one field of a certain focal strength and another field of another focal strength and a zone arranged intermediate of the two first-mentioned fields, clearly transparent and having no focal strength, and constituting a neutral zone, the whole being cut from a single piece of glass.

With this and other objects in view, my invention consists in the construction, arrangement and combination of the various parts of my lens, whereby the objects contemplated are attained, as hereinafter more fully set forth, pointed out in my claim, and illustrated in the accompanying drawings, in which:

Figure 1 shows a rear elevation of a bifocal lens embodying my invention.

Figure 2 shows a vertical, sectional view taken on the line 2—2 of Figure 1.

Figure 3 shows a similar view of a slightly different form of my invention.

Figure 4 shows a similar view of another form, in which my invention may be embodied; and Figure 5 shows a similar view of still another form.

Much work has been done heretofore by experts with a view of providing a lens or glass, which can be used for eye-glasses and which has two fields or portions of different focal strength.

One field is ordinarily for near vision and the other for distant vision.

Much difficulty has been experienced in producing a desirable structure. One of the earliest solutions of the problem involved placing two pieces of glass adjacent to each other, usually in a frame, and cementing the two pieces together, along their adjacent edges. This plan was not very satisfactory, because it left an unsightly line across the lens. The cement line became dirty and interfered with the vision on that account, and the cement line also interfered with the vision because it caused spherical aberration.

Various improvements have been made upon the old form of lens made of two pieces cemented together.

Others have cut on one piece of glass two fields of vision without any intermediate zone. This structure produces considerable aberration where the two fields merge into each other.

The so-called Kryptok lens involves a field of vision made of one kind of glass and a field of vision made of another kind of glass, the two pieces of glass being fused together. The glass, however, causes considerable aberration along the line of juncture between the two fields of vision.

That is to say with the lens just mentioned, as well as with many others that have heretofore been made, when the eye looks through one field of vision of the glass at an article and then the glass is changed, so that the eye looks through the other field of vision at the same article, there is confusion, which should not occur. This confusion is eliminated by my lens, which is herein explained.

Some have attempted to use two fields of vision with an intermediate zone, which had an optical strength intermediate between that of the two other zones or fields of vision. One inventor has provided an intermediate zone that was so cut in the glass as to gradually merge from one field of vision into the other, on the theory that one can run up or down an incline easier than to climb a flight of steps. I have found by long experiment that the least aberration is produced where two fields of vision are cut on one piece of glass and there is left between them an intermediate zone of no focal strength. In other words, an intermediate zone, which is clear glass, fully transparent, and without any magnifying or lens effect, is used.

The action of the muscles of the eye in adjusting from their position where a glass of one focal strength to position where a glass of another focal strength is used, is extremely quick. This can be verified by looking at an article close to the face and then instantly looking at an article at a considerable distance. The second article is clearly seen by the normal eye in an instant that is almost too short to appreciate.

I have found by experiment that it is better to go directly from one field of vision to another without passing through an intermediate field of a focal strength intermediate between the two fields of vision first mentioned.

It is well known that a transparent or semi-transparent intermediate zone is not desirable and imposes undesirable strain on the eye.

My experiments have shown that the intermediate neutral zone results in less spherical aberration than any other structure with which I am familiar and also imposes less work and strain upon the eye.

In the drawings, I have shown in Figure 1, a lens embodying my invention. The portion indicated by the reference numeral 10 indicates one field of vision, preferably having its center at 11. The portion 12 indicates another field of vision, preferably having its center at 13.

In Figures 1 and 2, I have illustrated a lens, which can be made by taking an ordinary lens, having its outer face curved, as shown, and grinding upon the inner face the field of vision 10, and then grinding on a portion of the lens the field of vision 12. I then grind or form the intermediate zone 14 by making the two faces of the zones parallel, so that the intermediate zone 14 has no focal strength.

It will be noted in this connection that on account of the curved outer face of the glass from which my lens is made, the inner face of the intermediate zone must be ground or shaped to conform to the outer face, so as to get the neutral effect in either the plus or minus lens.

In Figure 3, I have shown a lens in which the field 15, corresponding to the field 12, is first ground. Thereafter the field 16, corresponding to the field 10, is ground, and thereafter the intermediate zone 17, corresponding to the intermediate zone 14, is formed with its opposite faces parallel with each other, so that that zone may have no focal strength.

It will be noted that in the form of the device shown in Fig. 2 a shoulder is left at the edge of the zone or field of vision 10, while in the form shown in Figure 3, a shoulder is left adjacent to the zone 16.

In Figure 4, I have shown a lens having the field of vision 18, the field of vision 19 and the intermediate zone 20, the parts being so ground that there is no shoulder at all.

In Figure 5, I have shown still another form in which one face of the glass, as at 21, is flat, and the grinding for the one field of vision 22 is on the other or outer side of the glass, while the field of vision 23 is on the inner face of the glass. This form of my invention has the intermediate neutral zone 24 and leaves a shoulder 25 along the line of the zone 22.

In this connection, it may be mentioned that in order to provide glasses for the great variety of needs which exist, it is necessary to make a lens having a great variety of forms, but in each instance in order to embody my invention, there must be the two fields of different focal strength, for instance for near and distance vision, and there must be interposed between these two fields of vision or zones, a neutral zone, having no focal strength.

I claim as my invention:

A bifocal lens, having two fields of vision of different focal strength, and an intermediate zone between said two fields of vision of no focal strength, clearly transparent, the whole being cut from a single piece of glass.

Des Moines, Iowa, July 25, 1922.

LEW ARNTZ.